United States Patent [19]

Larner

[11] Patent Number: 4,584,644
[45] Date of Patent: Apr. 22, 1986

[54] METHOD OF CONTROLLING USE OF RESOURCES IN A DATA PROCESSING SYSTEM BY AT LEAST TWO PROCESSES

[75] Inventor: Adrian Larner, Leamington Spa, England

[73] Assignee: International Business Machines Corp., Armonk, N.Y.

[21] Appl. No.: 355,655

[22] Filed: Mar. 8, 1982

[30] Foreign Application Priority Data

Mar. 16, 1981 [EP] European Pat. Off. ........... 81301081

[51] Int. Cl.⁴ .............................................. G06F 9/32
[52] U.S. Cl. .................................... 364/200; 364/300
[58] Field of Search ............................. 364/200, 900

[56] References Cited

U.S. PATENT DOCUMENTS

| | | | |
|---|---|---|---|
| 4,104,718 | 8/1978 | Poublan et al. | 364/200 |
| 4,128,880 | 12/1978 | Cray, Jr. | 364/200 |
| 4,183,083 | 1/1980 | Chatfield | 364/200 |
| 4,224,664 | 9/1980 | Trinchieri | 364/200 |
| 4,318,174 | 3/1982 | Suzuki et al. | 364/200 |
| 4,481,583 | 11/1984 | Mueller | 364/200 |

OTHER PUBLICATIONS

Lexis Lexpat System, 1976, Mead Data Central.
System Programming, Donovan McGraw-Hill Computer Science Series, 1972, pp. 211-212.

Primary Examiner—Gareth D. Shaw
Assistant Examiner—Daniel K. Dorsey
Attorney, Agent, or Firm—Robert W. Berray

[57] ABSTRACT

A data processing system in which a process having a low priority may be interrupted by a process having a higher priority and in which an interrupted process ceases its current operation immediately the interrupt occurs, a mechanism by which the higher priority interrupting process finishes the interrupted operation of the lower priority process before commencing its own next operation.

3 Claims, 8 Drawing Figures (a) EMPTY (b) SINGULARLY (c) MULTIPLE (a) POST-SINGULARY (b) POST-MULTIPLE (c) POST-SINGULARLY (d) POST-MULTIPLE (a) EMPTY (b) SINGULARY (c) MULTIPLE (d) C-SINGULARY (e) C-MULTIPLE (a) INITIAL (GENERAL CASE)

(b) INITIAL (LISTEND)

(c) INITIAL (LISTART)

(d) INITIAL (SINGULARY)

(a) INSERTABLE (GENERAL CASE)

(b) INSERTABLE (LISTEND)

(c) INSERTABLE (LISTART)

(d) INSERTABLE (SINGULAR)

(e) PSEUDO-BOUND (GENERAL CASE)

(f) PSEUDO-BOUND (LISTEND)

METHOD OF CONTROLLING USE OF RESOURCES IN A DATA PROCESSING SYSTEM BY AT LEAST TWO PROCESSES

BACKGROUND OF THE INVENTION

1. Field of the Invention

This invention relates to digital data processing apparatus in which two or more processes which have access to one or more serially reusable resources within the addressable storage of the apparatus are performed concurrently.

2. Description of the Prior Art

The invention is applicable to data processing systems in which any or all of the following conditions hold:

1. concurrent processes may be performed by one or by many computers having access to the same addressable storage;
2. a controlling process or processes allocates the use of the computer or computers in the system to some or all of the processes in the system according to some scheme of priorities;
3. a process may either temporarily or permanently and either in the course of its normal performance or in the event of interruption by some other process, including input and output operations and machine and program malfunction, either itself abandon or be forced to surrender the use of a computer which was performing it;
4. a process, when it has temporarily either abandoned or been forced to surrender the use of a computer, may be restarted using either the same or another computer and either at the point where use of the computer was lost or at another point in the program or programs being then executed;
5. a paging mechanism is implemented either by hardware or by both hardware and programming whereby,
    some or all of the processes in the system may address not only data, including programs, in the main storage of the apparatus but also data held on peripheral storage including magnetic disks and drums, and
    upon reference by a process to data within its addressable storage but not in the main storage of the apparatus that process may lose the use of the computer performing it until such time as the paging mechanism has copied the required data from the device on which it resided at the time of reference into the main storage of the apparatus.

Terms and Expressions

In this description the term, process, is defined as a unit of work requiring the use of a computer and therefore may denote what are variously called jobs or job steps, tasks, exit processes, program threads, or service requests. Processes may be identified by the extents of storage allocated to them. At an instant each computer in a data processing system may identify one process, termed the active process on that computer which is the process being performed by that computer at that instant. This identification of an active process is effected by the values held in one or more registers which are component parts of the computer performing the process. Processes may be said to compete for the use of the computers in a data processing system this competition entailing such effects as: interruption of one process by another, and selection of one process rather than another to become the active process. A scheme of process priorities in a data processing system may be defined to determine of each pair of processes which, if either, may interrupt the other, and which will be selected in preference to the other. A process which may interrupt or which will be selected is said to be of higher priority than another process which may be interrupted by it or which may not be selected before it.

A process is to be distinguished from an operation which is a significant modification of values held within a data processing system, and from a program which is the embodiment of an algorithm serving to instruct a computer to execute one or more operations for its active process.

The term, addressable storage, is defined as part or parts of a data processing system which contains data, including programs, accessible by a process without the process itself moving that data from one part or type of storage to another.

The term, paging mechanism, is defined as a part or parts of a data processing system which so manages the data held in the addressable storage of processes that when a process attempts to access the data held in its addressable storage but not in the main storage of the apparatus the mechanism interrupts the process, initiates the movement of the referenced data into the main storage of the apparatus, and permits the interrupted process to resume use of a computer only when the data has been moved.

The term, serially reusable resource, is defined as part or parts of a data processing system which may be required for use in any process. It may be used repeatedly either by one or by many processes but it may not be used concurrently by two or more processes. If two or more processes have access to a serially reusable resource, some mechanism is required to ensure their serial use of it. An otherwise serially reusable resource may be concurrently reusable with respect to certain operations in particular those operations which access but do not modify the resource.

Among the serially reusable resources in a data processing system are lists, queues, and chains, hereafter collectively termed lists. A list comprises one or more extents of addressable storage commonly accessible by two or more processes and containing such values than when a process has located one extent of storage, termed the anchor, it may by manipulating the values held in it and in the other extents of storage, hereafter termed elements, locate each element in series. Each element of a list, with the exception of one element called the tail, is succeeded by another, no two elements having the same successor. Each element of a list therefore, with the exception of one element called the head, is preceded by another. A list may be singulary when it has just one element which is both the head and the tail, or it may be empty when it has no elements.

By allowing some or all of the elements of a list to serve as anchors for other lists, more complex structures may be constituted out of lists and manipulated by similar algorithms.

A list may be said to be in normal form when it is not allocated to a process. When a list is in normal form, the values in its anchor and elements are such as to enable any process to locate each element as described above and then to manipulate the list. Once a process has started but has not completed an operation on a list it may be that modifications made by the process to the values in the anchor and elements would prevent any other process correctly locating each element or correctly manipulating the list: a list in such a state would not be in normal form.

Usage of Lists In Data Processing Apparatus

Resource management programs, including operating systems, data base control programs, and timesharing and data communication monitors, are largely occupied in manipulating lists in order to allocate resources of the system to processes, to mark the release of resources by processes, and to identify and control the processes holding resources. Many such lists not only are themselves serially reusable resources but are used in the control of serially reusable resources. For example, the IBM OS ENQUEUE (IBM is a Registered Trademark of International Business Machines Corporation) facility is used to ensure the serial use of data held on magnetic media and itself employs lists of names such that the presence of a name in a list indicates the allocation of the data associated with that name to some process. Clearly, such a mechanism for the control of serially reusable resources cannot upon pain of infinite regress be used for the control of lists themselves.

Frequently encountered types of lists include chains of main storage buffers either allocated to a process or available for such allocation, queues of requests for the use of some resource such as an output device, and chains or queues of processes using or waiting to use some resource such as a program or a computer.

Current List Protection Mechanisms

Among the current methods of ensuring the serial use of lists are programmed locking mechanisms, disabling, and serializing hardware instructions. Locking mechanisms are of two kinds: suspend locks, sometimes called latches or gates, and spin locks.

A lock is a switch indicating whether its associated serially reusable resource is allocated to some process and possibly to which process it is allocated. If its associated resource is allocated a lock is said to be held. A process attempting to obtain a resource and finding the associated lock held will, if it is a suspend lock, abandon its use of any computer until the resource becomes available and the lock is released, or, if it is a spin lock, continue to use the computer but in an unproductive way looping within a program that intermittently checks the lock until it is released.

Disabling is a hardware mechanism whereby a process prevents the computer it is using being seized by some other process. It may be used with the intention that a process running disabled should be the only process being performed in a system but this intention is not achieved if either there is more than one computer in the system or the process being performed references data in its addressable storage but not in main storage thereby permitting the paging mechanism and thereafter some other process to use the computer. In current systems therefore it is ensured that all storage reference by a process that is running disabled is main storage and in systems with more than one computer disabling is used only as an adjunct to other mechanisms.

Serializing hardware instructions effect the controlled modification of small extents of storage. During the execution of such an instruction for a process, no other process, even if it is being performed on another computer, can modify the same storage. A serializing hardware instruction effectively acquires, uses, and releases a small extent of serially reusable storage in the course of its execution. Such instructions are used by locking mechanisms to hold and release locks. A process executing a serializing hardware instruction will either succeed in effecting a modification of storage, or fail if some other process had modified the same storage at or about the time of execution of the instruction.

Disadvantages and Limitations of Current Mechanisms

Locks suffer from these disadvantages:

Suspend Locks 1. force a computer to idle or to perform work of a lower priority than that of the suspended process;
2. they require extra use of a computer to control the suspension and resumption of processes;
3. if a paging mechanism is implemented, a process suspended on requesting a held lock may have some of its data transferred from main storage to peripheral storage and thereafter incur extra use of a computer and delay in performance owing to the execution of the paging mechanism.

Spin locks avoid these disadvantages but at the cost of wasted computer use. Locks of both kinds suffer from these disadvantages:

4. a process holding a lock may be delayed in its performance by a variety of causes, including interruption by other processes and execution of a paging mechanism, so imposing these delays on any other processes obliged to be suspended or to spin on finding the lock held;
5. a process holding a lock may terminate abnormally without releasing the lock, therefore mechanisms must be created to release locks under these cirsumstances and extra use of the computer be incurred in executing these mechanisms.

Processes holding or attempting to hold locks may be forced to use disabling or other mechanisms in order to reduce the risk of suspension while holding a lock. Disabling reduces the responsiveness of a system, that is to say that when a process is running disabled no process of higher priority may seize the computer performing it, thus the intention of the priority scheme is thwarted.

Locking and disabling are not themselves list manipulation mechanisms; they are merely methods of serializing the use of lists. The actual list manipulation is performed by normal programming. For example, a list in normal form, and not allocated to a process, might have an anchor containing addresses of the head and the tail, and elements each containing the address of its successor except that the tail might contain the value zero. In adding a new element to the end of the list a process might:

1. place the value zero in the new element, thus preparing it to become the tail;
2. acquire the list by holding its associated lock;
3. place the address of the new element in the tail thereby making the new element the tail;
4. place the address of the new element in the anchor.

Between (3) and (4) the list is not in normal form because the anchor does not contain the address of the tail.

It is because during its manipulation a list is not in normal form that the list is not concurrently usable but only serially reusable. Moreover, should a process terminate while a list being manipulated by it is not in normal form a recovery mechanism must be executed in order to restore the list to normal form. One of the principal objectives in creating a list manipulation mechanism is therefore to minimize the time during which lists are not in normal form. This objective is achieved to a high degree but within strict limitations by the serializing hardware instructions.

Serializing hardware instructions, such as the IBM System/370 Compare and Swap (CS) and Compare Double and Swap (CDS) described in the "IBM System/370 Principles of Operation", pp. 310-314, effect the conditional modification of small contiguous extents of addressable storage. When a process employs such an instruction to modify an extent of storage no other process can modify the same storage during the execution of the instruction. Consequently, if some operation can be executed on a list using just one serializing hardware instruction, the list being in normal form both immediately before and immediately after the execution of that instruction, then with respect to that operation the list is effectively concurrently usable.

Characteristically lists consist of several extents of storage at different locations so that, in all but the simplest cases, two or more non-contiguous extents of storage must be modified in order to execute some operation and return the list to normal form, as in the example above. As the serializing hardware instructions manipulate only small extents of contiguous storage, operations on such lists are currently executed under the protection of such mechanisms as locking.

It may be noted that a lock itself may be regarded as a degenerate case of a list which can only be either empty or singulary, such a simple list being manipulable by the serializing hardware instructions.

The advantages of the serializing hardware instructions are then that no process can be delayed, thereby delaying other processes, nor terminated, thereby requiring list recovery, while allocated a list manipulated by these instructions.

The invention, by means of programming or the equivalent of such programming implemented in hardware, extends the use of serializing hardware instructions to manipulate complex lists with minimal cost in computer use and minimal loss of responsiveness. It permits temporary or permanent loss of a computer by a process at any time during list manipulation without requiring the list being manipulated either to be released from such a process or to be restored to normal form before being manipulated by some other process. It permits the performance of a process to be resumed either at the point where it lost the use of a computer or at some other point.

The invention allows for the use of indefinitely many computers in a system and for the execution of paging mechanisms. It never requires a process to abandon the use of a computer nor to spin unproductively nor to disable and it permits a process to suffer delay caused either by the intervention of other processes or by the execution of a paging mechanism while manipulating a list without imposing that delay on other processes requiring access to the same list.

In sum, the advantages of the invention are just those of the serializing hardware instructions, but it does not suffer their rigid limitations.

Analysis of Operations On Lists

In order to understand the invention, it is necessary to analyze the operations executed on a list, these operations being the insertion, removal, and modification of elements in the list.

The anchor and elements of a list are held in storage addressable by two or more processes. Each process may also address storage exclusive to itself. A process may be said to own both the storage exclusive to itself and any elements which it has removed from a list.

Any operation executed on a list involves one or more transformations, a transformation being the modification of the anchor or an element in a list, which, according to the invention, is performed by means of a serializing hardware instruction. An operation either about to be started by a process or already partially executed may therefore be defined by an agenda or ordered set of transformations.

At an instant a list is in some state in the sense that there are certain values in the anchor, that certain elements are in the list, and that these elements are in a given sequence and contain certain values.

The definition of an algorithm to execute a set of operations on a list requires for each operation to be executed when the list is in each state a specification of the change of state to be effected and therefore a specification of the transformations required to that end. In current list processing algorithms no such specification is available when a list is in certain states, namely those states when the list is not in normal form.

A list may at an instant be such that either no operation or some operation which may be termed an active operation is being executed on it. If an operation is permitted to be executed on a list before the previously started operation has been completed, that is to say, on a list with an active operation, the integrity of the list may be lost. For this reason lists are, in general, serially reusable. Current algorithms debar a process not merely from starting an operation on such a list but from modifying the list at all.

SUMMARY OF THE INVENTION

According to the invention there is provided a data processing system in which one or more processes may attempt to execute an operation on a list at a time when an active operation has been only partially executed on that list, characterized by a mechanism that operates to ensure only one active operation is permitted on a list at any instant, each process attempts to complete the active operation before starting any other operation, the active operation is executed by one or more of the processes attempting to execute it, and all operations on a list are executed serially irrespective of the number and priorities of processes starting those operations.

BRIEF DESCRIPTION OF THE DRAWINGS

In order that the invention may be fully understood embodiments of its principal concepts and some currently known mechanisms, and preferred embodiments of the invention will now be described with reference to the accompanying drawings, in which.

DESCRIPTION OF PREFERRED EMBODIMENTS

Annex 1 describes the terms and expressions used in the formal definitions of algorithms.

Annex 2 formally defines an embodiment of a currently implemented algorithm.

Figure 5:
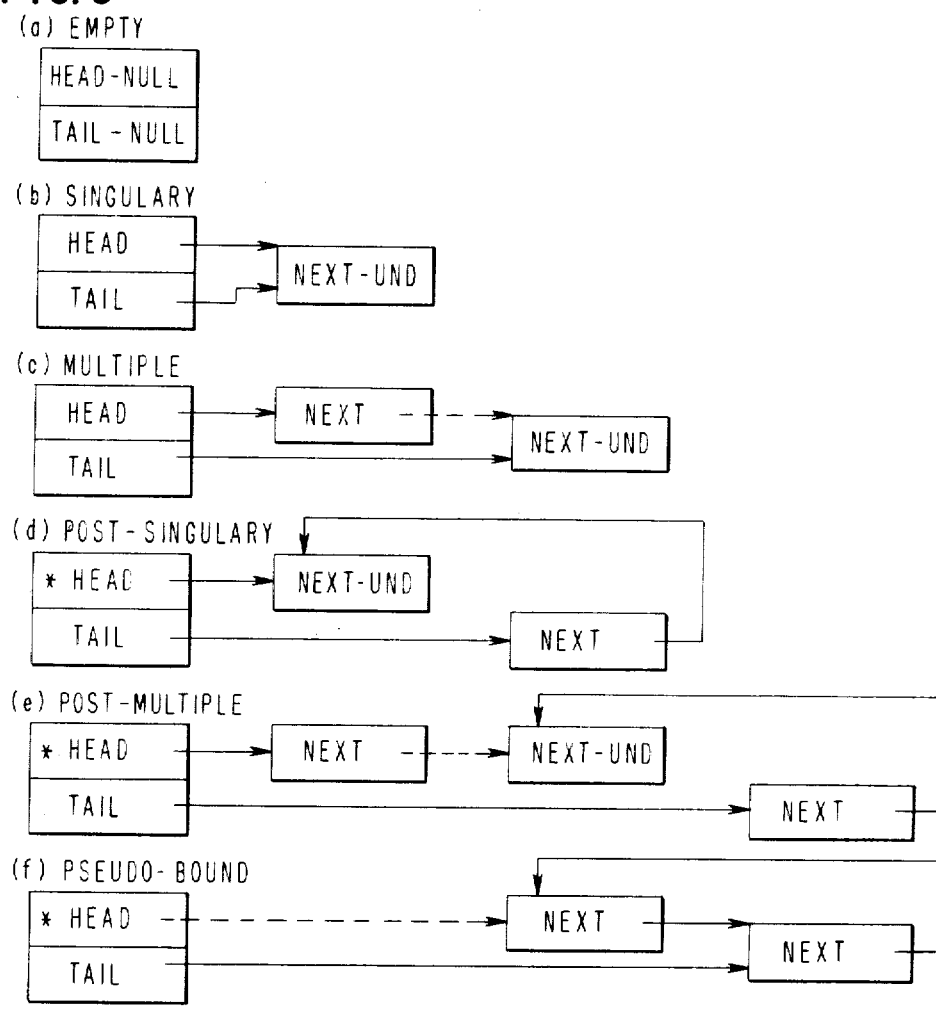
FIG. 5 illustrates formats for an embodiment of the invention, First-In, First-Out Queue.

Annex 3 formally defines an embodiment of the invention, the First-In, First-Out Queue whose formats are shown in FIG. 5.

Figure 6:
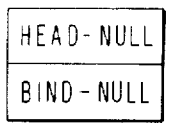
FIGS. 6 to 8 illustrate formats for another embodiment of the invention, a Last-In, First-Out and Priority Queue.
Figure 6:
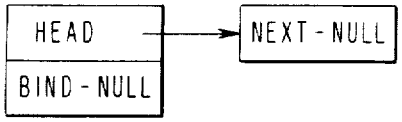
Figure 6:
Figure 6:
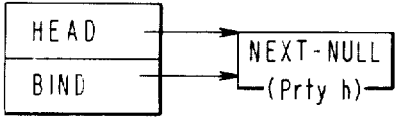
Figure 6:
Figure 7:
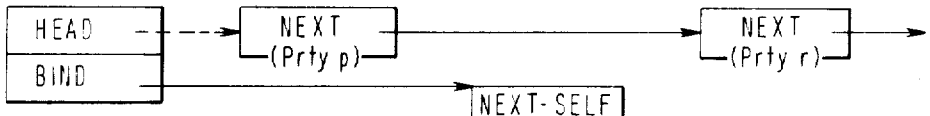
Figure 7:
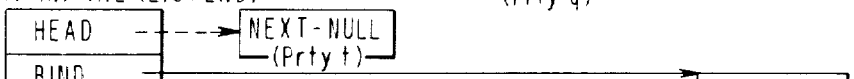
Figure 7:
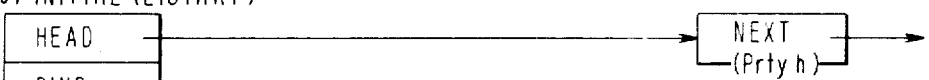
Figure 7:
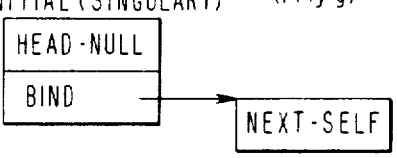
Figure 8:
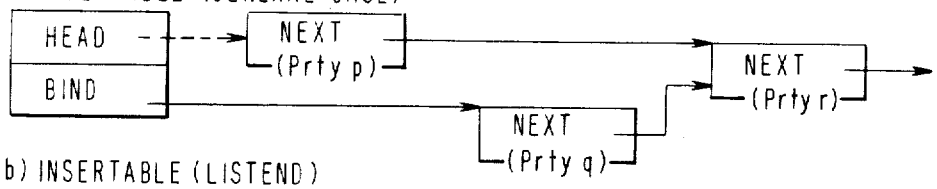
Figure 8:
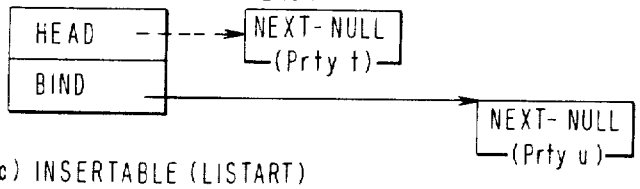
Figure 8:
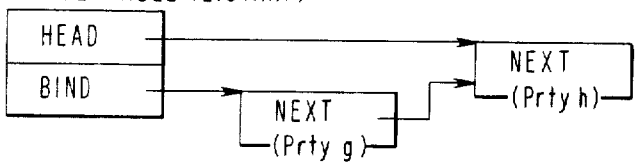
Figure 8:
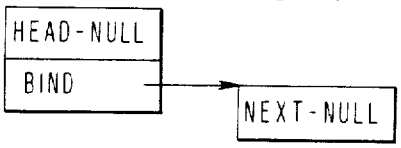
Figure 8:
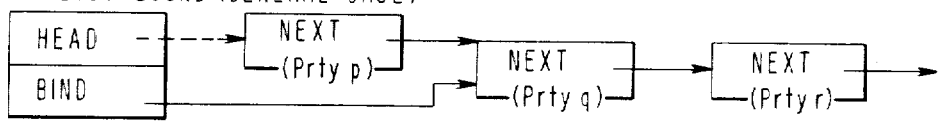
Figure 8:
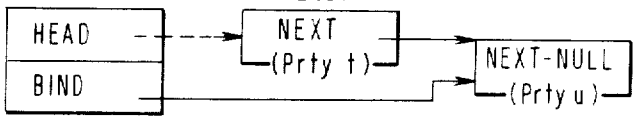

Annex 4 formally defines an embodiment of the invention, the Last-In, First-Out and Priority Queue whose formats are shown in FIGS. 6 to 8.

Annex 5 formally defines a partial embodiment of the invention, illustrating a general algorithm, modifications of which could generate algorithms for other disciplines of list manipulation.

Figure 1:
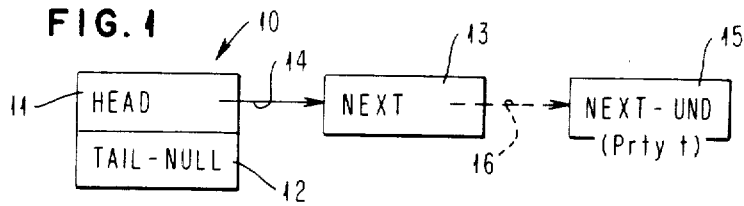
FIG. 1 is the key to the other figures.

In FIG. 1, an Anchor 10 is shown on the left. Two fields of the Anchor 10 are shown: Head 11 and Tail 12. Head 11 points to an element 13, shown centre: the line 14 indicates this relationship. Tail 12 is null.

The centre element 13 points to (an element which points to . . . ), i.e. is chained to, the element 15 shown on the right: the line 16 indicates this relationship. Zero or more elements may lie within the chain. A single field is shown in the first element 13: Next.

In the element 15 on the right Next is undefined—it may have any value; this element also has a Priority value, marked as "t".

Serializing Hardware Instructions—Operation

A serializing hardware instruction is to be understood as operating in the following manner:

the instruction has three operands, each of which is an extent of storage; the first and second operands are private to the executing process, the third operand is accessible by all processes that may execute the instruction;

the values in the operands are called respectively the old, new and current values;

upon execution of the instruction, all processes accessing the third operand complete that access and are then not permitted to access that operand until the instruction is complete; the old value is compared with the current value, if not equal the instruction completes, otherwise the new value is placed in the third operand, becoming the current value and the instruction completes;

following the execution of the instruction, the process that executed it can test whether it succeeded on an equal comparison or failed on a not equal comparison and therefore whether it did or did not replace the current value.

In the IBM System/370 the first two operands are general purpose registers, the third is part of main storage; the Compare and Swap instruction accesses four, and the Compare Double and Swap accesses eight contiguous bytes (eight bit characters) in each operand. On a not equal comparison these instructions load the current value into the first operand but this feature is inessential and is ignored hereafter. The term SWAP is used hereafter in reference to a serializing hardware instruction as described above.

A SWAP is used in the following way: to update an extent of storage accessible by many processes, copy the contents of that extent of storage into storage private to the executing process thus establishing the old value; calculate the required new value and hold that also in storage private to the process—the extent of storage to be updated now contains the current value, which may be the old value; and SWAP the new value into the extent of storage to be updated, checking the old and current values and leaving the current value unchanged if they are unequal.

If the SWAP fails on a not equal comparison, restart the entire algorithm by again copying the contents of the extent of storage.

It will be seen that the essence of this method is to work on data in private storage, unaffected by other processes, and then to update commonly addressable storage just if the information on which the update is based is still valid.

List Formats

A list consists of one or more parts each of which is a block, i.e. contiguous extent of addressable storage namely an anchor and zero or more elements. Each block may be divided into fields.

Each part of a list contains at least one pointer. A pointer is a field used to contain either the address of another block, to which it is said to point, or a value from which such an address can be calculated, or it may for special purposes either point to the block in which it is itself contained or contain a nominated value, generally zero, indicating that it points nowhere: this nominated valud is called NULL and a pointer containing it is called a NULL pointer.

An anchor generally contains a pointer to the first element, or head, of the list and may contain a pointer to the last element, or tail, of the list. Characteristically, such pointers will be NULL if the list is empty. An anchor may contain other data such as a count of elements on the list or a value associated with the control of serial use of the list.

An element generally contains a pointer to its successor and may contain a pointer to its predecessor. Characteristically, such pointers in the tail and head respectively will be NULL. An element may contain other data such as priority values used in placing new elements in the list or a value associated with the control of serial use of the list.

Generally, each list in a system has just one anchor, and each anchor is associated with just one list. Elements however, may be moved from list to list.

The various states in which a list may be found can be classified into formats, thus a list which is singulary may be said to be in the Singulary Format, so that this one format comprises any one of a large number of states characterized by the list having just one element. The formats of a list may themselves be classified according to whether they comprise states which arise when no operation is active on the list or when an operation is active on the list: such formats may be respectively termed Basic Formats and Active Formats.

As provided in the invention, a list in an Active Format must indicate what agenda of transformations remain to be performed in order to complete the active operation. Such a list and its agenda may be said to be bound to each other. In practice, it is convenient to set a value in the anchor to show that a list has an active operation on it and therefore is bound to an agenda. Unless the final transformation of the bound agenda modifies the anchor such a switch may be left on when the operation is complete, and in consequence the list may appear from its anchor to be in an Active Format but examination of its elements may reveal that no further transformations are required: a list in such a state may be called pseudo-bound or bound to an empty agenda. Certain of the Active Formats of a list comprise one of these pseudo-bound states. It is therefore convenient to further classify list formats into those which are properly Active in that they comprise a state with a non-empty agenda, and those which are either Basic or comprise a pseudo-bound state: such formats may be respectively termed Routed Formats and Unrouted Formats.

List Operations

The principal operations executed by list manipulation algorithms are the placing of an element into a list hereafter called a PUT and the removal of an element from a list hereafter called a TAKE.

The PUT operations include (but are not exhausted by) the following:

PUT HEAD—place an element into a list as the first element of the list;

PUT TAIL—place an element into a list as the last element of the list;

PUT by Priority—place an element into a list at a position determined by priority values associated with it and with the other elements in the list.

The TAKE operations include (but are not exhausted by) the following:

TAKE HEAD—remove the first element from the list;

TAKE Specific—remove a given element from the list.

In addition to these operations, complementary operations may be defined. Certain processes, when they fail to remove an element from a list either because the list is empty or because there is no suitable element on the list, suspend their performance until an element is put into the list by another process. In order to facilitate the resumption of such a suspended process, a complementary element may be placed in the list when a TAKE fails. This complementary element indicates which process should be resumed when a normal element is placed in the list.

In an algorithm allowing complementary elements therefore a TAKE request may be either conditional or unconditional: the former will result in a take operation or a PUT Complement. A PUT request will result in either a PUT operation or, if there are complementary elements in the list, a TAKE Complement.

Generally, each list in a system is associated with a particular processing discipline which determines which operations may be performed on the list:

a list restricted to PUT Head and TAKE Head is called a Last-In, First-Out (LIFO) Queue;

a list restricted to PUT Tail and TAKE Head is called a First-In, First-Out (FIFO) Queue;

a list restricted to PUT by Priority and TAKE Head is called a Priority Queue.

Analysis of List Processing Operations—Current Limitations

Given the processing discipline to be applied to a list, the analysis of operations on the list requires definition of: the Formats of the list, the Changes Of Format effected by each operation, the agenda of Transformations which constitute each operation, each of which effects one Change of Format, and the Storage Accesses involved in each Transformation.

Figure 2:
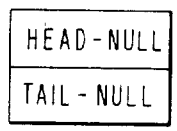
FIGS. 2 and 3 illustrate possible formats for a First-In, First-Out Queue.
Figure 2:
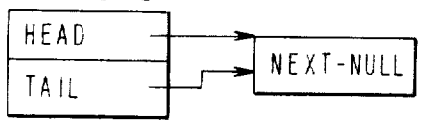
Figure 2:
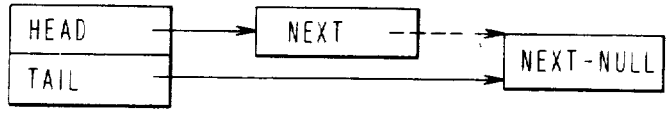

The limitations of current methods of list manipulation may be demonstrated by applying this method of analysis to a FIFO Queue. The Basic Formats of the list are shown in FIG. 2. In principle, indefinitely many formats could be defined for lists having zero, one, two and so on elements; in practice, because the list is modified only at its ends, only one format (FIG. 2C) is defined for lists having two or more elements.

This format is defined using the is chained to rather than the points to relationship: if an element, say E, either points to another element, say F, or points to an element which points to F, or points to an element which points to an element which points to F, and so on, then E is said to be chained to F. Formally, is chained to is the ancestral of points to.

The Active Formats of the list may be defined as shown either in FIG. 3A and B, or in FIG. 3C and D: the former pair of formats require that a PUT Tail first make the old Tail element point to the new element then make the anchor point to the new element, the latter pair require these transformations to be performed in the reverse sequence. Either method may be selected.

The Changes of Format may now be defined, that is to say for each format and each operation, if that operation is attempted on the list in that format, to which new format, or series of formats, will the list be set. These Changes of Format may be conveniently summarized in a table (here the Active Formats shown in FIGS. 3A and B have been selected):

| Operation | In Format: | | | | |
| --- | --- | --- | --- | --- | --- |
|  | 2a | 2b | 2c | 3a | 3b |
| TAKE Head | 2a 1 | 2a | 2b or 2c 2 | | |
| PUT Tail | 2b | 3a—2c | 3b—2c 3 | | |

Notes:
1 TAKE fails on empty list
2 Format with one less element
3 Format with one more element In this table, formats are listed along the top line and operations down the leftmost column, entries in the table indicate the resultant format or sequence of formats. Notes show where an operation fails and where an element has been added or removed (where there might be ambiguity).

It will be observed that certain entries have been left blank: these represent the coincidences of formats and operations that a locking mechanism would be required to prevent by delaying the process attempting the operation. In effect a locking mechanism identifies normal form with Basic Format.

From the Changes of Format the required Transformations may be defined:

for TAKE Head,
  if Empty—no change, TAKE fails,
  if Singulary—Anchor Head and Tail pointers set to NULL,
  if Multiple—Anchor Head pointer reset to value of Head element Next pointer,
  if Post-singulary or Post-multiple—undefined;

for PUT Tail,
  if Empty—Anchor Head and Tail pointers set to point to new element,
  if Singulary or Multiple—Tail element Next pointer set to point to new element, then Anchor Tail pointer set to point to new element, if Post-singulary or Post-multiple—undefined.

The Storage Accesses required by each Transformation, can be classified according to the addressability of the storage and the effect of the access.

Extents of storage used in list manipulation include those in storage addressable by only one process, hereafter termed private, and those in storage addressable by more than one process, hereafter termed public.

Lists are held in public storage—their elements may be termed listed elements. If a process executes a TAKE it thereby acquires an element which was, but is now not, part of a list: such an element may be termed an unlisted element. A process executing a PUT must have acquired the new element to be added to the list, probably by a previous TAKE: such an element will be an unlisted element before the execution of the PUT.

Each unlisted element therefore is owned by just one process but is in public storage so the list manipulation algorithm must ensure that processes other than the owning process do not modify an unlisted element. The principal obstacle to a process modifying an unlisted element that it does not own is that no pointer to the element is to be found in public storage. On a TAKE Head for example, the only pointer to the head element in public storage namely that in the anchor is overwritten in the performance of the TAKE. Of course, some process may have copied such a pointer into its private storage before the TAKE was performed: the list manipulation algorithm must ensure either that such a copy is not made or that if made it is not used to modify the now unlisted element. Generally, once a pointer to an unlisted element is placed into some part of a list, as by a PUT, that element becomes listed.

A Storage Access may either change, or simply reference the value held in the storage:

the term transaction may be applied to a change of public storage, either an anchor or a listed element, in any embodiment of the invention invariably effected by a SWAP, the term preparation may be applied to a change of an unlisted element, generally in the course of a PUT, the term examination may be applied to a reference (with no change) of public storage, either an anchor or listed element, private storage accesses are of less significance and will not require separate designation.

As an example of this detailed level of analysis, the first transaction of the PUT Tail operation can be defined as:

the preparation of the new element (an unlisted element) by setting its Next pointer to NULL, an examination of the Anchor to determine from its Tail pointer the location of the Tail element, the examination of the Next pointer of that element: copying it into private storage as the old value for the next SWAP, and the transaction of SWAPPing a pointer to the new element into the Tail element Next pointer.

The presence of two or more transformations in one operation may necessitate locking in current list processing algorithms, but even where each operation can be reduced to a single transformation, for example, by omitting the Tail pointer from the Anchor of a FIFO Queue and searching down the elements to find the last one, it may not be possible to avoid locking. Though only a single transformation is required, it contains multiple examinations. The information gained from those examinations may be incorrect by the time the final transaction is executed (the extreme case being where the list has been emptied by some other process). Thus, locking is currently required not only to protect lists in active formats from manipulation by processes other than the active process, but also to ensure the validity of information gleaned from the list by a process in the course of a single transformation.

Some currently available list processing algorithms do ensure serial use of lists by serializing hardware instructions alone but they impose one or more of the following restrictions:

each operation is to consist of just one transformation;

no operation is to include multiple examinations;

certain operations, such as PUT Tail, are to be performed by just one process on any given list;

each process is to be allocated a distinct priority and while a process is performing an operation on a list no other process of lower priority is to obtain the services of any computer in the system. This restriction can be enforced only in single computer systems and requires that no paging mechanism shall seize control of the computer from a process which is performing an operation on a list.

The invention removes all these restrictions.

List State Control

Certain information about the state of a list must be available to any process placing an element into or removing an element from that list. For example, a process removing an element from a LIFO queue needs to know the address of the first element in the queue and the address of the second element in the queue, which it will be making the new first element. This information is obtained by one or more examinations of a part or parts of the list, preparatory to a SWAP or SWAPs.

It will be recognized that a SWAP fails when the value of the third operand changes between the copying of the old value and the execution of the SWAP Instruction. If a part of the list such as the anchor is updated by a SWAP this update is performed conditionally upon the maintenance of the state of the list insofar as the state of the list is reflected in the part being updated. If a SWAP is used to manipulate a list, assuming that the algorithm is otherwise correctly coded, it is therefore a sufficient condition for the maintenance of integrity of the list that the checking in the SWAP detect any state change that has occurred in the list since the relevant part or parts of it were copied into private storage. Ensuring that this condition holds may be termed List State Concentration: the state of a list has been concentrated for a SWAP when that SWAP will fail if the information on which it relies has changed since it was obtained by examination of the list.

One mechanism which is currently used, and which is extensively employed in the invention, to detect state changes is the incrementation of a modulus in a part of a list, generally the anchor. A modulus is a number which can be incremented to some maximum value depending on the length of storage available for it and which returns to its minimum value when a process attempts to increment it past its maximum. The use of a modulus can best be seen by considering the following mistaken algorithm.

A LIFO Queue consists of an Anchor which contains just a Head pointer and elements which each contain just a Next pointer, the Tail element's Next pointer being NULL.

PUT Head is performed by:
  pointing the New element's Next pointer to the Head element of the list, and
  SWAPPing a pointer to the new element into the Anchor's Head pointer.
TAKE Head is performed by:
  identifying the Head element from the Anchor's Head pointer,
  SWAPPing the Head element's Next pointer into the Anchor's Head pointer.

Appropriate modifications of these operations are used for empty lists, but these are not relevant to the example.

The flaw in the algorthm can be seen by considering what might happen during a TAKE.

Let the list consist of the anchor (A) and two elements (E and F), this may be simply represented as:

A→E→F the active process copies A so creating the old value namely a pointer to E. E is now located and copied so creating the new value namely a pointer to F. The process is now ready to SWAP the new value into A in order to create a list consisting of just A and F:

A→F but let the process now be interrupted before it executes this SWAP, and let another process or processes become active and execute the following sequence of operations:
  TAKE—element E leaves the list—
  A→F
  TAKE—element F leaves the list—
  A
  which is now empty,
  PUT a new element (G) into the list—
  A→G
  PUT the element E into the list again—
  A→E→G Let the interrupted process now resume and attempt to SWAP the new value into the anchor. Despite the change of state of the list, the old and current values are equal, both being pointers to E: the SWAP therefore succeeds. The list should consist of A and G, E having been removed—
  A→G in fact consists of A, F, and those elements, if any, following F in whichever list F has been placed—
  A→F→?

and the integrity of the list has been lost.

Clearly the contents of the anchor in such a list do not adequately reflect the state of the list.

If we also include in the anchor a field which can vary in value from zero to an indefinitely large number, and every time we SWAP the anchor in order to TAKE we increment the value in this field then such a SWAP as that described above will fail, for the new field which is included in the SWAP check will have been incremented by two since the anchor was copied to create the old value. In practice, such a field cannot be provided as it would be of indefinite length, however a modulus of reasonable length gives effectively the same protection; a sixteen bit modulus is a threat to list integrity only if while a process is executing one operation on the list about sixty thousand modulus incrementing operations are performed by other processes.

It should be noted that it is not the modulus alone but the total contents of a part of the list that provide an indication of state change. Not every operation therefore requires the modulus to be incremented, in fact the less frequently a modulus is incremented the better, that is either the more security is provided or conversely the smaller the modulus need be. In the example above for instance, it is not strictly necessary to increment the modulus on a TAKE from a singulary list.

Figure 4:
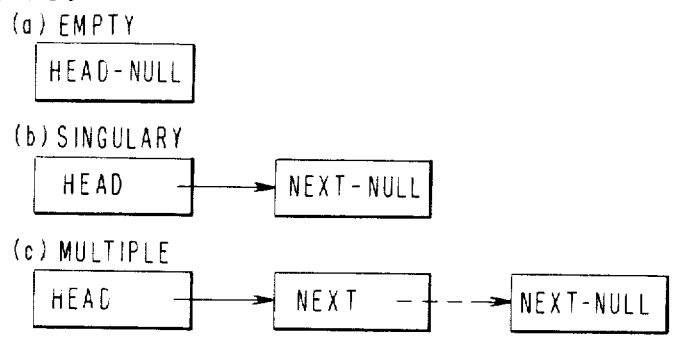
FIG. 4 illustrates formats for a currently implemented Last-In, First-Out Queue.

Algorithms for such a LIFO Queue are defined in the IBM System/370 Principles of Operation, pp. 310-314 and in this specification—see FIG. 4 for the Formats and Annex 2 for definition of the Algorithm.

This algorithm is included to illustrate the current state of the art, to allow familiarization with the notation of the Figures of Formats and the definition language used in the Annexes, and to serve as an introduction to the LIFO and Priority Queue algorithm which is an extension of it. The Changes of Format of the LIFO Queue are given in the following table:

| Operation | In Format; 4a | 4b | 4c |
|---|---|---|---|
| TAKE Head | 4a   1 | 4a | *4b or *4c   2 |
| PUT Head | 4b | 4c | 4c   3 |

Notes:
*Modulus in anchor incremented
1 TAKE fails on empty list
2 Format with one less element
3 Format with one more element LIFO Queues have then been implemented using serializing hardware instructions alone, more complex lists—even the relatively simple FIFO Queue—cannot currently be so implemented without serious restrictions. The invention permits the implementation of algorithms that manipulate lists more complex than LIFO Queues without these restrictions and is in principle applicable to lists of much greater complexity than those currently implemented with restrictions.

Non-Serial State Verification

The introduction of a modulus into a part of a list is one method of ensuring that the value held in that part of the list shall adequately concentrate the state of the list for the purposes of the next SWAP to be executed on it. A second method used in the invention may be termed non-serial state verification. This is nothing more complex than a comparison performed between a field or fields in public storage and a previously copied value of the same field or fields in a private storage.

SWAPPing has been described above: a SWAP is serialized and includes a comparison which is a list state verification; non-serial state verification is a similar state verification but does not modify any value in storage and can be implemented by ordinary non-serialized comparison instructions.

A non-serial state verification is to be understood as operating in the following manner:
  the instruction has two operands, each of which is an extent of storage; the first operand is storage private to the executing process, the second operand is storage accessible by all processes that may execute the instruction;
  the values in the operands are called respectively the old and current values;

upon execution of the instruction, the old value is compared with the current value and the instruction completes;

following the execution of the instruction, the process that executed it can test whether it succeeded on an equal comparison or failed on a not equal comparison.

The term CHECK is used hereafter in reference to a non-serial state verification as described above.

In the invention only a successful SWAP constitutes a transaction, that is to say that any embodiment of the invention attempts to modify the values held in anchors and listed elements only by means of SWAPPing. An examination however may be constituted by a failed SWAP, or by a CHECK, or by copying the value of an anchor or listed element into private storage.

The Problems of List Manipulation and Their Solution

In order to understand the invention fully, it is necessary to have an explicit understanding of the two major problems of list manipulation, by serializing hardware instructions alone, that it solves, and the peculiar logic required to implement it. The two problems, which have already been adumbrated are:

to sever the connection between Basic formats and normal form by ensuring that a list is always in normal form, and to ensure list state concentration before every SWAP.

If a list is always to be in normal form, it follows that any process attempting to manipulate a list in order to execute any operation must be able to manipulate that list forthwith; at the same time, if operations are to be serialized, it follows that if an operation is active on a list then a process cannot start another operation on the list. The conjunction of these two requirements entails that any process finding an operation active on a list can only attempt to complete that active operation. The special logic required to control a multiplicity of processes all attempting to execute the same operation may be called re-executable.

Maintenance of Normal Form By Serialization Of Operations

It is an essential principle of the invention that while it may be generally impossible for many processes to execute different operations on a list simultaneously, it is possible to create the re-executable algorithms that permit many processes to execute the same operation on a list. Thus, operations on a list may be serialized without serializing processes.

In manipulating a list therefore a process may be at any instant associated with two operations:

its own operation in order to execute which it has begun to perform the list manipulation algorithm on the list, and the active operation on the list.

Any embodiment of the invention will generally ensure that:

if there is an active operation on the list, the agenda of transformations remaining to complete that operation is available to the process by examination of the state of the list, the performance of the first transformation of that agenda will either complete the active operation leaving the list in an Unrouted format or will replace that agenda by a smaller agenda comprising just those transformations needed to complete the active operation, if there is no active operation on the list, and the process has not initiated its own operation, then one part of the list, generally the anchor, will be designated as the next part to be SWAPped, such a SWAP constituting the initiation of the process own operation, if the processes own operation comprises only one transformation, then its initiation will also be its completion, otherwise its initiation will effect the binding to the list of the agenda of transformations required to complete the process own operation, which will thereby become the active operation, the process will no longer manipulate the list when
1. it has initiated its own operation, and
2. that operation is no longer the active operation, the process whenever it executes a CHECK or a SWAP which fails will re-examine the list and if it has initiated its own operation but that operation is not the active operation, cease to manipulate the list, if it has not initiated its own operation, then it will attempt to complete any active operation and initiate its own, as described above.

Nevertheless, there are certain circumstances where somewhat less rigidity than is here implied will be acceptable:

where a process requires no more information about its own operation than that its successful execution is ensured it may cease to manipulate the list as soon as it has initiated its own operation even if, in so doing, it leaves its own operation active on the list:

such an operation may be termed non-productive and is exemplified by a PUT Tail to a FIFO Queue, other operations such as TAKE Head are productive in that the owning process needs to know not merely that the operation was successful but also which element was TAKEn, where the final transformation of the agenda bound to a list, or the transformation which returns a pseudo-bound list to Basic Format, is a transformation of that part of the list, generally the anchor, designated as the part to be SWAPped to initiate any operation, that transformation and the initiation of a process's own operation may be effected by the same SWAP, and in the rare cases where two operations can be simultaneously executed on a list (i.e. where the list is concurrently reusable with respect to one of the operations) they need not be serialized: one example is that a discipline permitting TAKE head, PUT Head, and PUT Tail, will permit PUT Head to be performed safely irrespective of any other operation active on the list.

Achievement of List State Concentration

The problem of concentration is to so represent the state of the list being manipulated in the next part of the list to be SWAPped that the SWAP will fail if the list state changes. This problem can be illustrated by means of the FIFO Queue logic illustrated in FIGS. 2 and 3a and b and analyzed above. If a list is singulary, see FIG. 2B, two processes may attempt to manipulate it concurrently the one attempting a TAKE and the other a PUT. The TAKE process SWAPs the anchor to create an empty list, see FIG. 2a; the PUT process SWAPs the single element to create a postsingulary list, see Diagram 3a. If these SWAPs are executed either simultaneously or immediately consecutively the list is emptied and the TAKEn element is pointing to the newly PUT element. In effect the PUT process has modified an unlisted element. Neither the value in the anchor nor that in the single element gave an adequate representation of the state of the list.

In order to solve the problem of List State Concentration, it is assumed that serialization of operations has been achieved as described above. At any instant therefore the state of a list, in conjunction with the provisions of the list manipulation algorithm, indicates either that there is an active operation on the list,
what part of the list is to be SWAPped in the next transformation, and
what change of state that transformation is to effect, or
that there is no active operation on the list and
what part of the list is to be SWAPped in the next transformation, this transformation constituting the initiation of the next operation to be executed on the list.

It follows that if a process has complete information about what the state of a list was at some instant then it can determine which part of the list was, or was to be, SWAPped next. An instant about which a process has determined such complete information may be termed an information point.

It may now be demonstrated that a process can obtain an information point, in the following laborious way if in no other: let the process be at a point where it has no information about the state of the list except the location of the anchor, we may term this the Retry point of the list manipulation algorithm.

Each part of a list incorporates a modulus which is changed on sufficient transformations of that part, if necessary on all transformations of it, to ensure that, within the period of time allowed by the size and frequency of change of the modulus, the total value held in the part, and compared on each SWAP or CHECK of it, will be different from one instant to another if any transformation of the part occurred between those two instants.

The following procedure is to be performed:

The anchor is copied into private storage; from each non-NULL pointer value in the copy of the anchor in turn an element is located and copied into private storage;

from each non-NULL pointer value in the copies of the elements in turn an element is located and copied into private storage, no element being copied more than once, this process being repeated until all parts of the list have been copied and the copies held in private storage.

During this procedure, after copying any element the copy of the anchor and the copies of all elements previously obtained are CHECKed against the current values of the parts of the list from which they were copied:
if any CHECK fails, some other process must have modified the list and the process restarts from the Retry point;
if no CHECK fails, the procedure continues.

When every part of the list has been copied, and the final CHECKs have been successfully performed, it has been established that the instant at which the last element was copied is an information point: the private storage of the process contains total information about the list at that instant. It may be noted that when the information point is obtained, it is in past time; the present instant is not an information point, for the value in any part of the list may have changed since it was last CHECKed.

The process can now determine the next SWAP to be executed after the information point and
the process attempts the SWAP.

As each part of the list is provided with a modulus it can be ensured that upon SWAPping it, its value will become different from what it was at any time close to the last information point, so
if the SWAP of the selected part of the list succeeds, no other process could have performed any transformation on the list between the information point and the SWAP, for any process was obliged to SWAP that part,
if the SWAP of the selected part fails then some other process must have succeeded in SWAPping the same part: the process restarts from the Retry point.

It can be seen that at the information point the state of the list has been concentrated into the value of the selected part of the list.

When a series of examinations as described above is followed by a successful SWAP, the time of the SWAP becomes an information point. The process having performed such a successful SWAP may therefore immediately determine whether, according to the provisions of the list manipulation algorithm, it has completed the procedure or must attempt the next SWAP in order either to complete the execution of the active operation or to initiate its own operation.

A process that has already initiated its own productive operation may discover during the examinations described above that its own operation is no longer the active operation and so complete the procedure without obtaining an information point, or without performing a SWAP. Such a process will have previously performed at least one successful SWAP, namely that initiating its own operation.

In practice, it is rarely necessary to copy and CHECK an entire list, sufficient indication of its state and bound agenda, if any, being given by a small number of its parts. The algorithms described below illustrate this limited examination.

Re-executable Algorithms

Embodiments of the invention therefore have this characteristic: within the algorithm there is a Retry point, as described above, from which point a, not necessarily exhaustive, series of examinations of a list are performed; any process executing the algorithm following the Retry point
completes its manipulation of the list, or
effects at least one transformation, or
detects that some other process has effected a transformation.

The algorithm, and in particular that part following the Retry point, may be described as reexecutable in that a process may execute it indefinitely many times but still achieve the same result with respect to its own operation as it would have achieved had it executed the algorithm just once with all SWAPS and CHECKS successful.

Looking at such an algorithm with respect to operations rather than processes, we may view it as a method whereby agendas are performed on a list by a mechanism which ensures that if at least one and optionally indefinitely many processes are manipulating a list one transformation after another will be performed but which process will perform any given transformation is undetermined, except that each process performs at least that transformation which initiates its own operation.

Because the invention divorces processes in this way from operations and because many processes have to a large extent the same effect as a single process, not only can a process manipulating a list lose control of a computer without ill effect but it is more efficient in computer use for a process so to lose control and permit other processes to manipulate the list with fewer failed SWAPs and CHECKs.

The only overheads of the invention are the manipulation wasted when SWAPs and CHECKs fail (and this overhead is reduced as the apparatus becomes busier with handling interrupts) and the ingenuity required in devising such algorithms.

DESCRIPTIONS OF EMBODIMENTS OF THE INVENTION

Two embodiments of the invention are described: for FIFO Queuing and for LIFO Queuing with Priority Queuing of Complementary Elements. The former represents a commonly used discipline for queuing of work to a serially reusable resource; the latter is appropriate for control of passive resources such as fixed length storage buffers for the use of processes of different priorities.

The Changes of Format defined for these algorithms are classified into changes of Routed Formats which are independent of the operation being attempted (the processes own operation), and changes of Unrouted Formats, which are dependent on the operation being attempted, and are effected after any changes of Routed Format have been effected (after the active operation has been completed). The changes of Routed Format are therefore repeatedly attempted until an Unrouted Format has been created.

A generalized, and ipso facto incomplete, algorithm is also described.

| FIFO Queue Algorithm | | | | |
|---|---|---|---|---|
| Algorithm Name: | | FIFO | | |
| Definition: | | Annex 3 | | |
| Formats: | | FIG. 5 | | |
| Format Changes: | | | | |
| | In Routed Format: | | | |
| Operation: | 5d | | 5e | |
| Any | @5f | | @5f | |
| | In Unrouted Format: | | | |
| Operation | 5a | 5b | 5c | 5f |
| TAKE Head | 5a  1 | 5a | *5b or *5c  2 | *5b or *5c  2 |
| PUT Tail | 5b | 5d | 5e | 5e |

Figure 3:
Figure 3:
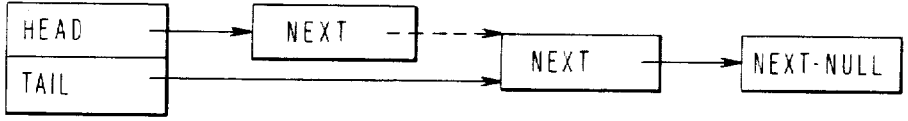
Figure 3:
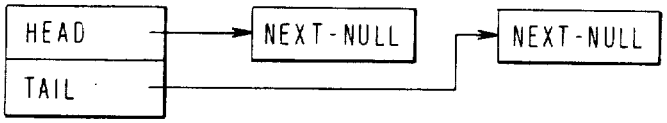
Figure 3:
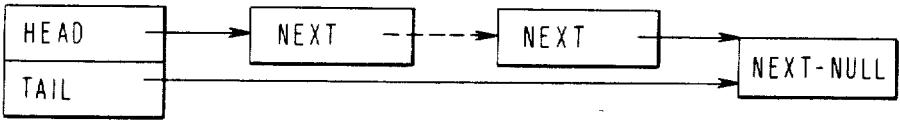

Notes:
@Modulus in Element incremented
*Modulus in Anchor incremented
1 TAKE fails on empty list
2 Format with one less element The formats may be contrasted with those in FIGS. 2 and 3 a and b. In particular, it should be noted that the tail element does not necessarily contain a NULL pointer: the tail element is recognized as such because the tail pointer in the anchor points to it. FIG. 5 Formats d, e, and f illustrate Active Formats, their agendas are indicated by the Bound Flag, shown as an asterisk, the tail pointer in the anchor, and the pointers in the tail and old tail elements: Formats d and e have the same agenda, a single transaction to make the old tail point to the tail, so creating format f which has an empty agenda.

The format changes shown above indicate that formats d and e are Routed Formats: they are inevitably transformed to format f. Of the operations shown, the TAKE is a single transformation operation and the PUT a double transformation operation, the second transformation being the chaining of the old tail of a list in Routed Format. The PUT operation is non-productive, so leaves a list in Routed Format.

The algorithm defined in Annex 3 is described below:
at label Fifo
  the parameters passed to the algorithm are a pointer to the anchor and a pointer which is NULL for a TAKE operation or points to the unlisted element to be PUT.
  The anchor, and each of its copies in private storage when made, contains a pointer to the first element, a pointer to the last element, and a Bind Flag or Switch—these are shown in FIG. 5, and a modulus; the elements and any copies of them, each contain a pointer to their successor—also shown in FIG. 5, and modulus.
  It should be noted that in formats d, e, and f the pointer in the tail element is used to point not to its successor but to its predecessor.
At label Retry, (this is the Retry point) the anchor is copied.
  It will be noted that an empty list, see format a, cannot be bound to an agenda. The logic for a list in Basic Format, i.e. not Bound, may be considered first.
  For a TAKE, control passes to label Take or if the list is empty to label Exit via label Void (failed TAKE).
  The PUT logic depends on whether the list is empty or not: a PUT to an empty list is effected in one transformation, to a non-empty list in two, consequently when the list is not empty the Bind Switch is set to indicate that the partial agenda containing the second transformation is bound to the list.
  This modification of the anchor is first made in the new anchor which is a copy of the anchor held in private storage, and this is the practice throughout all embodiments of the invention (see Serializing Hardware Instructions—Operation).
  If a previous PUT has left the Bind switch on, the Unbind routine is invoked to complete the PUT before any other operation is initiated.
At label Void,
  failed TAKE is detected.
  A PUT to an empty list is commenced by setting the anchor's head pointer, see formats a and b.
  (Thereafter the PUT operation is identical for both PUT to an empty list and PUT to a non-empty list, the Bind Switch having already been set in the latter case.)
At label Put,
  the new (unlisted) element is about to become the tail element of the list in format b, d, or e.
  The new element is made to point to the old tail, or if the list is empty is made NULL, then the new anchor's tail pointer is made to point to the new element.

At this point, if the anchor has not been modified since the Retry point, the new anchor has the value which should be SWAPped into the anchor.

At label Take,
   a singulary list, format b, is identified by the head and tail pointers having the same value, empty lists having already been excluded.
   If the list is not singulary, the head pointer in the new anchor is made to point to the second element in the list and the modulus is incremented (just as in the LIFO logic).

At label Single,
   the new anchor is made to represent an empty list.

At label Swap,
   an attempt is made to initiate an operation, PUT or TAKE.
   If it fails the algorithm is restarted.
   If it succeeds either a double transformation PUT has been initiated, or a TAKE or a single transformation PUT to an empty list has been performed.
   In either event, the algorithm ends at label Exit.

At label Exit,
   the output parameters, relevant only for a TAKE, are described.
   Control returns to the program that invoked the algorithm.

At label Unbind. The Unbind routine has three functions:
   1. to identify the agenda as either empty, as in format f, or not, as in formats d and e,
   2. in the latter case to effect the transformation to format f, and in any event,
   3. to set off the Bind Switch in the new anchor. It may be noted that if the executing process own operation is a PUT, the Bind Switch will be set on again as described above.

The Bind Switch is set off.
The tail element is copied, this is of course the element being PUT in the active operation;
   from its pointer the old tail element, called in the definition the Sacral Element, is located.
This element is also copied and then tested to see if it already points to the tail element, the condition called Chained and indicating an empty agenda as in format f.
If the agenda is empty than it is probable that another process is manipulating the list for format f is rarely found when no process is executing the algorithm, so
   the anchor is CHECKed to ensure that it has not been modified since the Retry point, and
   if it has not been modified execution continues from the instruction following the CALL of the Unbind Routine.
This CHECK is not strictly necessary as a similar test is implicit in the next anchor SWAP, but in practice it may be more efficient than a failed SWAP.
If this, or any, CHECK fails the algorithm is restarted from the Retry point. Format f having been eliminated the algorithm prepares to SWAP the old tail element in order to
   make it point to the tail element and to increment its modulus,
   the incrementation of the modulus being necessary for list state concentration.
Just before the SWAP the anchor is CHECKed, and this CHECK is necessary for list state concentration, although the exhaustive method described above is not.
The old tail element is then SWAPped.
If the SWAP fails of course the algorithm is restarted from the Retry point,
   otherwise the agenda has been emptied and the Unbind routine returns control to the instruction following its CALL.

As the algorithm will then continue to SWAP the anchor, so creating format b, c, d, or e, it can be seen why format f is nearly always very transistory.

A non-transistory format f can be caused either by failure and termination of a process before it can SWAP the anchor or by the strange coincidence that the tail element of a list in format b or c points to an unlisted element which is PUT into the list so effecting a transformation from format b or c to format f: though odd, this is quite harmless and in fact saves a SWAP.

At label Check,
   the anchor is CHECKed.

It should be noted that the RETURN is to the instruction following the CALL of Unbind after the first CHECK described above, but to the instruction following the CALL of Check after the second CHECK described above—in the former case CHECK was invoked by GO instead of CALL (see Annex 1 for Terms and Expressions used in Definitions of Algorithms).

The function of the Unbind routine can be summarized thus: it ensures that the list is in Unrouted Format, format f, and prepares to return the list to Basic Format, format c, by setting off the Bind Switch in the new anchor; consequently the logic for lists in Basic Formats is applicable after the invocation of Unbind.

LIFO and Priority Queue Algorithm
LIFO Queue with Priority Queue of Complementary Elements
Algorithm Name:        Compl
Definition:            Annex 4
Formats:               FIGS. 6, 7 and 8
Format Changes:

| | In Routed Format: | | | | | |
|---|---|---|---|---|---|---|
| Operation | 7a | 7b | 7c | 7d | 8a | 8b |
| Any | @8a | @8b | @8c | @8d | <8e | <8f |

Note: Routed formats 8c and 8d included below

| | In Unrouted Format: | | | | | |
|---|---|---|---|---|---|---|
| Operation | 6a | 6b | 6d | 6d 8d | 6e<br>8e | 8c<br>8f |
| TAKE Head | 7d 1 | 6a | *6b or<br>*6c 2 | 7b or<br>7c 1,4 | 7a or<br>7b or<br>7c 1,4 | |
| PUT by Prty | 6b | 6c | 6c 3 | 6a 5 | *6d or<br>*6e 2,5,6 | |

Notes:
@Modulus in Active Element incremented
<Modulus in Previous Element incremented
*Modulus in Anchor incremented
1 TAKE converted to PUT Complement
2 Format with one less element
3 Format with one more element
4 depending on Priority
5 PUT converted to TAKE Complement
6 Exception - format 8e cannot change to format 6d This algorithm may be compared with the LdFO Queue Algorithm of Annex 2, Formats shown in FIG. 4. In particular, in FIGS. 4 and 6, Formats a, b, and c are strictly equivalent, as are their associated changes in the leftmost three columns of the above table of Changes of Unrouted Formats, with the exception of TAKE from an empty list. The LIFO algorithm is incorporated almost unchanged—see Annex 4 from label Compl down to label Retry and label Normal down to label Exit.

In order to understand the algorithm it may be assumed that each process is a task having some priority associated with it, priorities being used in the allocation of resources to tasks. Each task marks the elements it owns with its priority. The list being manipulated is a list of resources, such as fixed length storage buffers, which when placed in the list are made available to any task. While there are sufficient resources the list is simply a LIFO Queue and any task requiring one of the resources just takes the first one on the queue.

When there are no resources on the queue any task requiring a resource must suspend execution until one becomes available. The task leaves a note on the queue that it is waiting for a resource. When a resource becomes available it is desired to allocate it to the highest priority waiting task (the highest priority task whose note is on the queue). The queuing of these notes or complementary elements must therefore be in priority order.

Such a list may clearly be in either of two conditions, normal when it has no complementary elements or complemented. In FIG. 6 the formats a, b, and c represent a list in normal condition—all these are Basic Formats; the Basic Formats in complemented condition are shown in formats d and e. The formats shown in FIGS. 7 and 8 are Active Formats.

It will be seen that PUT Complement is in essence a three transformation operation.

The first transformation is the initiation of the operation and consists of setting in the anchor a pointer to a new complementary element in the Next pointer of which points to itself. This generates one of the Initial Formats as shown in FIG. 7.

The second transformation requires that the list be searched in order to discover between which elements the new element should be placed: in the figures the parameters of priority which determine the sequencing of elements are shown as letters which should be arranged in alphabetic sequence. The elements involved in the insertion are called:

the Active Element—which is the element being inserted, the Previous Element which is to become the predecessor of the Active Element, and the Following Element which is to become the successor of the Active Element The second transformation makes the Active element point to the Following Element. This generates one of the Insertable Formats as shown in FIG. 8a to d.

The final transformation completes the insertion of the Active Element by making the Previous Element point to it. When the new element should be inserted as the first element in the list the final transformation must be performed on the anchor and is therefore conveniently performed by the same SWAP that initiates the next operation (see the entries for Formats 8c and 8d in the Table above). This saving of a transaction is associated with the Condition Listart in the algorithm definition: in this condition, the Active Element lacks a predecessor (it is to become the head element): the Condition Listend in the algorithm definition applies when the Active Element lacks a successor (it is to become the tail element); when both Listart and Listend apply, the list is Singulary (the Active Element is the only element).

The other operations executed on the list - TAKE an element, normal or complementary, and PUT a normal element—are all single transformations. It may be noted that the multiple transformation PUT Complement is non-productive.

The algorithm defined in Annex 4 is described below:
at label Compl,
the parameters passed are similar to those for the FIFO Queue, but it should be noted that the Pointer Element is never NULL as even a TAKE request must pass an element which may be queued as a complementary element. A TAKE is therefore signalled by making this element's Next pointer point to the element itself.

The element contains a priority and the anchor indicates a relation related: this should be read as one of the following less than
greater than
equal to
not equal to
not greater than
not less than
either equal to or not equal to (always true) both equal to and not equal to (always false).

This relation is used to end the search down the list on the condition:

Priority of the Active Element is related priority of the putative Following Element.

i.e. if this condition is true, the Following Element has been identified.

If no Following Element is identified, the element is inserted at the end of the list (condition Listend). It will be seen that the always true relation creates a LIFO queue,
the always false relation creates a FIFO queue, and
the greater than relation creates a genuine Priority Queue with higher priority for a greater priority parameter (elements of the same priority being queued FIFO).

In FIGS. 6 to 8 it is assumed that alphabetically earlier letters are less than later letters and the relation related is the less than relation, so the highest priority is represented by "a" and the lowest by "z".

At label Retry,
(this is the Retry point, all failed SWAPs and CHECKs cause a restart from here)
the anchor is copied.
The conditions Complemented and Bound are defined.

There is no Bind Switch as in the FIFO Algorithm, instead a Bind pointer takes the place of the Tail pointer which is not required. If this pointer is neither NULL nor pointing to the first element of the list then it is pointing to an element to be inserted into the list—this element must be a complementary element—and the list is bound to some, possibly empty, agenda. The definition from this point down to the label Normal is concerned with the processing of such lists, which have formats shown in FIGS. 7 and 8.

The Active Element, which is to be inserted, is located and copied.

Values are now set to begin a search of the list.

The search conceptually consists of placing the Active element between the anchor and the first element, between the first and second elements, between the second and third, and so on until it is placed between the penultimate and the last, testing the priority relation in each position and stopping when the appropriate position is found. If none is found, the Active Element is placed at the end of the list—condition Listend.

To begin the search, the condition Listart is set: the Pointer Previous which during the search will point to the putative Previous Element is made to point to the anchor.

The Pointer Following points to the putative Following Element so is first set to point to the first element in the list.

In formats 7d and 8d there is no first element in the list, consequently at this point both conditions Listart and Listend are in effect.

At label Search,
the search is iterated until the condition Listend is found, if not terminated earlier.

The putative Following Element is located and copied (this element is the one pointed by the Previous Element, or if Listart, the anchor head pointer).

A fairly extensive state verification is then performed by CHECKing the anchor, the Active Element, and (except when Listart) the Previous Element.

If this is successful the priority relation is tested and if found true the search is terminated—the Active Element has effectively been placed.

If the priority relation is found false the Active Element is conceptually moved on to the next position in the list: the Following Element is now regarded as the Previous Element and the pointer to the new Following Element is set.

On looping back to label Search, as described above, the new Following Element is located.

The search always completes by going to the label Found unless a CHECK fails.

At label Check,
the state verification is performed.
if unsuccessful control returns to the Retry point.

At label Found,
the conditions tested relate to the active format thus:
Initial holds for the formats shown in FIG. 7,
Pseudobound for the formats shown in FIG. 8e and f,
neither for the formats shown in FIG. 8a to d.

It may be noted that the condition Pseudobound is an alternation of two sentences: which of these two may hold is dependent on the relation *related*. If a list is pseudo-bound the search will stop either when the Active Element is the same element as the Previous Element or when it is the same element as the Following Element.

These are the two possibilities defined in the Pseudobound condition: the former holds when *related* is "less than", "greater than", "not equal to", or the always false relation, the latter holds for the other relations.

At label Juston,
the formats shown in FIG. 7 are converted to the similarly lettered formats (a to d) in FIG. 8.

When the Next pointer in the Active element is made to point to the Following Element (or to become NULL when Listend) the modulus in the Active element is simultaneously incremented.

At label Insert,
the Listart condition identifies formats 8c and 8d whose final transformation will be effected in the SWAP initiating the next operation on the list.

Formats 8a and 8b are converted to formats 8e and 8f respectively.

At label Unbind,
the pseudo-bound formats 8e and 8f cause the copy of the anchor called the New Anchor to be marked as not bound.

At label Sethead,
Formats 8c and 8d are handled by indicating in the New Anchor that the Active Element should be the new first element, and simultaneously unbinding the New Anchor.

At label Normal,
normal condition LIFO processing is performed.

At label Void,
what in normal LIFO processing would be a failed TAKE is changed into a PUT Complement.

At label Put,
normal LIFO processing continues.

At label Unbound,
no matter whether reached from Unbind, from Sethead, or by bypassing all the search processing, the New Anchor has been marked as unbound. The next anchor SWAP after that point will, mark the anchor unbound unless it is bound by the next transformation, and effect the next transformation.

As the list is in complementary condition a TAKE is changed into a PUT Complement, and a PUT into a TAKE Complement.

The TAKE Complement processing is normal TAKE processing preceded by recording which complementary element is taken, and resetting the Bind pointer. It may be noted that if the list is singularly as in format 6d this reset of the Bind pointer, along with the reset of the Head pointer by the TAKE logic, will make it empty, so effecting the change shown in the second row and fourth column of the Table above.

If the list is not singulary this reset of the Bind pointer simply leaves the list complemented but unbound.

At label Take,
the common TAKE processing is performed (i.e. TAKE proper or PUT converted to TAKE Complement).

At label Putcomp,
a TAKE was intended, but the list was either empty or complemented.

As a TAKE is signalled by the Pointer Element pointing to an element which points to itself, by binding this element to the anchor one of the formats shown in FIG. 7 must be created.

This constitutes the initiation of the multiple transaction PUT Complement.

At label Swap,
common anchor SWAPping is performed.

At label Exit,
the Condition Fail indicates a failed, i.e. delayed, TAKE. The invoking program should cause the task to wait until restarted. Upon restart the desired element will be made available.

The Condition Schedule indicates a PUT has been converted to a TAKE Complement:
the desired element should be used to restart the waiting task that placed it on the queue, the element that was to be put, i.e. the current processes own element should be made available to the restarted task.

The condition Taken indicates a successful TAKE.

If none of these conditions hold a normal PUT has been performed.

Clearly, this algorithm needs to be used with a suspend-resume mechanism and with another list processing algorithm that manages a list of free elements that tasks may acquire in order to invoke this algorithm and release after invoking this algorithm.

In practice, the algorithm as defined would not necessarily succeed perfectly in its objectives: a process having completed a PUT which was converted into a TAKE Complement might be interrupted before it had restarted the highest priority waiting process.

Another process might then perform another PUT and either succeed in putting a normal element into the list or perform a TAKE Complement and restart the second highest priority waiting process. The algorithm could be modified to prevent this possible failure in implementation of the priority scheme, but as this would involve placing the process resume logic within the algorithm itself it would complicate the exposition and has therefore not been described here.

A noteworthy characteristic of the algorithm is the amount of work done in the search and unbind logic. This could be reduced by having the initiating process of a PUT Complement perform a similar search before initiating its own operation, the element bound to the anchor could then be bound already having been set to point to the Following Element. Whether, and in what circumstances, this modification might give an improvement in performance has not been investigated. One consequence of the algorithm in its present form is that the agenda bound to a list consists in effect of all the information to be found in the list, but this is a theoretical effect which may have no practical implications.

General Algorithm

A schematic general algorithm is defined in Annex 5.

The algorithm is a framework incorporating the general principles of the invention; the following notes indicate the sort of logic which needs to be inserted into it.

Preface

Input definition, location of the Current Anchor, definition of fields in Anchor and Element, definition of conditions in particular:

Active—true when the executing processes own operation is the active operation, probably dependent on values in the New Anchor and the Input data;

Bindable—true when the executing processes own operation has an agenda of more than one transformation, dependent on the Input data and possibly on values in the New Anchor;

Nonproductive—true when the executing processes own operation is non-productive, dependent on the Input data.

Test New Anchor

Definition of conditions in particular:

Bound—true when the anchor is bound to a (possibly empty) agenda, and possibly checking for and processing special conditions such as empty or singular list.

Identify and Verify Next Transaction

Examination of the list, identification of the first transformation of the agenda, state verification using CHECK going to Retry, definition of the condition:

Pseudobound—true when the bound agenda is empty, resetting the New Anchor to not Bound.

Perform Next Transaction

SWAPping the appropriate part of the list identified by the Identify and Verify next Transaction logic.

Perform Own Operation

Performing a single transformation operation using a SWAP.

Initiate Own Operation

Performing the first transformation of a multiple transformation operation so binding an agenda to the list and setting the Bound condition using a SWAP.

Exits

Output definitions and RETURN.

ANNEX 1—TERMS AND EXPRESSIONS

Terms Used in the Definitions of Algorithms

In the definition of algorithms, terms in lower case letters are used in three ways:
1. as connectives in instructions and definitions, as described under *Commands;*
2. as connectives in statements, as described under *Statements;*
3. as truth functional connectives of statements the following terms are used— not not *statement* is the negation of statement;

and *statement*-1 and *statement*-2 is the conjunction of *statement*-1 and *statement*-2;

or *statement*-1 or *statement*-2 is the inclusive alternation of *statement*-1 and *statement*-2.

In the definition of algorithms terms with just their initial letters capitalized are used in five ways:
1. as labels marking the commands which follow them, or in GO, CALL, and RESTART commands indicating the transfer of execution to the commands preceded by the same lables;
2. as abbreviations for statements, as defined by the CONDITION command;
3. as field names. To avoid ambiguities and increase readability field names may be either preceded by field types such as POINTER or followed by an expression of the form:

of Blockname Blocktype;
4. as block names;
5. as block types. A block is a part of a list, a copy of a part of a list, or such a copy with one or more fields modified subsequently to their being copied.

A block is named by a block description which is an expression of the form:

*Blockname Blocktype* where *Blockname* is a block name and *Blocktype* is a block type.

In the definition of algorithms, terms in capitals are used in three ways:
1. as command identifiers occurring as the first term in an instruction or definition;
2. as field types. The following terms are used—
   POINTER a pointer,
   MODULUS a modulus,
   SWITCH a field which can contain just one of two values ON and OFF,
   PARAMETER a field containing a numeric value for comparison,
   RELATION a field marking a relation for a comparison
3. as values. The following terms are used—
   NULL the NULL value, set in pointers, ON and OFF the two values which can be set in a SWITCH

*Statements*

Statements are expressions which at any point in the execution of an algorithm are either true or false. A statement may be either simple or compound.

A simple statement is of the form:
*field relation operand,*
where field is a field descriptor, i.e., an expression of the form:
*fieldtype fieldname*
or of the form:
*fieldname* of *blockname blocktype*
as described above;
*relation* is an expression such as:
   is greater than
and *operand* is either
   a field descriptor
or
   a value term such as NULL.

A simple statement is true when the relation expressed by *relation* holds between the value of the field named by *field* and the value of the field named by, or the value indicated by, *operand*.

When *operand* is a value term and *relation* expresses simple equality or inequality then *relation* is written as:
   is
or
   is not
rather than as:
   is equal to
or
   is not equal to.

A compound statement is formed by connecting simple statements by negation, conjunction, and alternation, as described above.

When defined by the CONDITION command a single term may serve thereafter as complete statement, either simple or compound.

Commands

Commands are either definitions or instructions. In a given implementation of an algorithm the instructions would be implemented as one or more machine instructions. The definitions serve to interpret the expressions used in the instructions. The definitions LOCATE and WHEN are related to instructions in certain implementations as described below.
Instructions that Transfer Control of Execution
   GO to *label.* Execution continues at the point in the algorithm where *label* marks a command.

CALL *label.* The address of the point immediately following the CALL instruction is conceptually placed on a stack, the Return Stack, and execution continues at the point in the algorithm where *label* marks a command. The Return Stack is deemed to be empty on entry to the algorithm.

RETURN. If the Return Stack is empty execution of the algorithm is complete. Conceptually, control returns to the program which invoked the algorithm. If the Return Stack is not empty, the last address placed on the stack is removed from it and execution continues at the point indicated by that address.

RESTART from *label.* The return Stack is emptied and execution continues at the point in the algorithm where *label* marks a command.

Conditional Commands
   IF Statement *command.* The truth of statement is tested: if it is true the command *command* is executed, otherwise execution continues following the IF instruction.
   WHEN Statement *command.* The WHEN command is a definition which indicates how the program to which the algorithm passes control may process the information returned to it. This program may issue an IF instruction of the same form as the WHEN command, i.e., the instruction: IF statement *command.*
   OTHERWISE *command.* The OTHERWISE instruction is written immediately following an IF instruction. If on execution of the IF statement instruction statement was true then the command *command* in the OTHERWISE instruction is not executed, but execution continues following the OTHERWISE instruction; if statement was false then *command* is executed.
   IF FAILED *command.* The IF FAILED instruction is used following SWAPs and CHECKs. It may be read as an IF command in which FAILED is the statement that the just executed SWAP or CHECK discovered the inequality of the Old and Current Values.
   SWAP (operand-1, operand-2, operand-3).
   and
   CHECK (operand-1, operand-2). The expressions operand-1 etc. are block descriptors of the form:
   *Blockname Blocktype*
   The execution of SWAP and CHECK is as defined respectively in *Serializing Hardware Instructions—Operations* and *non-serial State Verification.*
Non-serialized Data Modification Instructions
   COPY operand-1 to operand-2, operand-3, . . . : The expressions operand-1 etc. are either all block descriptors or all field descriptors, in the latter case the values of operand-2, etc. are set to the value of operand-1; in the former case the values of all the fields in operand-2, etc. are set to the values of similarly named fields of operand-1, the block types of operand-1, etc. are identical.
   SET field to *value.* The value of the field named by the field descriptor field is set to the value identified by *value.*
   INCREMENT field. The modulus named by the field descriptor field is incremented, as described in *List State Control.*
Data Definitions
   INPUT is field-1, field-2 . . . The expressions field-1, field-2, etc. are field descriptors naming the fields made available to the algorithm by the program that invoked it.

FIELDS of block are *type*-1 name-1, *type*-2 name-2, . . . The expression block is a block type such as Element, the expressions *type*-1, *type*-2, etc. are field types such as POINTER, the expressions name-1, name-2, etc. are field names such as Next. Each block of type block is defined as comprising fields *type*-1 name-1, *type*-2 name-2, etc.

It should be noted that following a FIELDS definition, the fields of a block will be referred to as name of blockname block, for example:
Next of New Element OUTPUT is field-1, field-2, . . . The expressions field-1, field-2, etc. are field descriptors naming the fields made available by the algorithm and containing information relevant to the program that invoked it.

Definitions of Synonomy

CONDITION name *statement*. The expression name is to be read as if it were (i.e. is to be treated as an abbreviation of) the expression *statement*.

LOCATE blockname blocktype from *field*. The expression *field* is a field descriptor of a pointer which points to the block named by blockname blocktype.

It should be noted that if the value in the pointer *field* is implemented as an address then it may be that no machine instruction will be required to implement this command. If however, pointers are implemented as displacements from a known address, this command may have to be implemented as the calculation of an address from such a displacement.

*Definition and Mofidication of Storage Areas*

Blocks in public storage are explicitly defined by the appearance of their descriptors in the first operand position of a LOCATE command.

Blocks in storage private to the executing process are implicitly defined by their block descriptor's appearing as the operand or part of an operand of an instruction.

All block types are explicitly defined in FIELDS commands.

Fields within blocks are defined by the definition of their containing blocks and the associated FIELDS commands.

Fields not in blocks, which are all private to the executing process, are either explicitly defined by the appearance of their descriptors in INPUT commands or implicitly defined by their descriptors appearing as the operand of an instruction.

It should be noted that when a field within a block is modified by an instruction such as COPY, SET or INCREMENT, the other fields in that block are unchanged.

*ANNEX 2—LAST-IN-FIRST-OUT QUEUE PROGRAM*

(for illustration—state of the art algorithm)
Lifo.
   INPUT is POINTER Anchor, POINTER Element.
   CONDITION Taking is POINTER Element is NULL.
   LOCATE Current Anchor from POINTER Anchor.
   FIELDS of Anchor are POINTER Head, MODULUS Amod.
   FIELDS of Element are POINTER Next.
Retry.
   COPY Current Anchor to Old Anchor, New Anchor.
   CONDITION Empty is Head of New Anchor is NULL.

IF Empty GO to Void.
   IF not Taking GO to Put.

LOCATE Desired Element from Head of Old Anchor.
   COPY Next of Desired Element to Head of New Anchor.
   IF not Empty INCREMENT Amod of New Anchor.
   GO to Swap.
Void.
   IF Taking GO to Exit.
PUT.
   LOCATE New Element from POINTER Element.
   COPY Head of Old Anchor to Next of New Element.
   COPY POINTER Element to Head of New Anchor.
Swap.
   SWAP (Old Anchor, New Anchor, Current Anchor).
   IF FAILED GO to Retry.
EXIT.
   OUTPUT IS Head of Old Anchor, POINTER Element.
   CONDITION Fail is Taking and Head of Old Anchor is NULL.
   WHEN Taking and not Fail
      LOCATE Desired Element from Head of Old Anchor.
RETURN.

*ANNEX 3—FIRST-IN-FIRST-OUT QUEUE PROGRAM*

Fifo.
   INPUT is POINTER Anchor, POINTER Element.
   CONDITION Taking is POINTER Element is NULL.
   LOCATE Current Anchor from POINTER Anchor.
   FIELDS of Anchor are POINTER Head, POINTER Tail, MODULUS Amod, SWITCH Bind.
   FIELDS of Element are POINTER Next, MODULUS Emod.
Retry.
   COPY Current Anchor to Old Anchor, New Anchor.
   CONDITION Empty is Head of New Anchor is NULL.
   CONDITION Bound is Bind of New Anchor is ON.

IF Empty GO to Void.
   IF Bound CALL Unbind.

IF Taking GO to Take.
   SET Bind of New Anchor to ON.
   GO to Put.
Void.
   IF Taking GO to Exit.
   COPY POINTER Element to Head of New Anchor.
Put.
   LOCATE New Element from POINTER Element.

COPY Tail of New Anchor to Next of New Element.
COPY POINTER Element to Tail of New Anchor.
GO to Swap.
Take.
  LOCATE Desired Element from Head of Old Anchor.
  CONDITION Singulary is Head of Old Anchor is equal to Tail of Old Anchor.
IF Singulary GO to Single.
  COPY Next of Desired Element to Head of New Anchor.
  INCREMENT Amod of New Anchor.
  GO to Swap.
Single.
  SET Head of New Anchor to NULL.
  SET Tail of New Anchor to NULL.
Swap.
  SWAP (Old Anchor, New Anchor, Current Anchor).
  IF FAILED GO to Retry.
Exit.
  OUTPUT is Head of Old Anchor, POINTER Element.
  CONDITION Fail is Taking and Head of Old Anchor is NULL.
  WHEN Taking and not Fail
    LOCATE Desired Element from Head of Old Anchor.
  RETURN.
Unbind.
  SET Bind of New Anchor to OFF.
  LOCATE Tail Element from Tail of New Anchor.
  COPY Tail Element to Work Element.
  LOCATE Sacral Element from Next of Work Element.
  COPY Sacral Element to Old Element, Chain Element.
  CONDITION Chained is Next of Chain Element is equal to Tail of New Anchor.
  IF Chained GO to Check.
  COPY Tail of New Anchor to Next Of Chain Element.
  INCREMENT Emod of Chain Element.
  CALL Check.
  SWAP (Old Element, Chain Element, Sacral Element).
  IF FAILED RESTART from Retry.
  RETURN.
Check.
  Check (Old Anchor, Current Anchor).
  IF FAILED RESTART from Retry.
  RETURN.

ANNEX 4—LAST-IN-FIRST-OUT AND PEIORITY QUEUE PROGRAM

Compl.
  INPUT is POINTER Anchor, POINTER Element.
  LOCATE Current Anchor from POINTER Anchor.
  LOCATE Own Element from POINTER Element.
  FIELDS of Anchor are POINTER Head, POINTER Bind, MODULUS Emod, Relation *related*.
  FIELDS of Element are POINTER Next, MODULUS Emod, PARAMETER Priority.
Retry.
  COPY Current Anchor to Old Anchor, New Anchor.
  CONDITION Complemented is Bind of New Anchor is not NULL.
  CONDITION Bound is Complemented and Bind of New Anchor is not equal to Head of New Anchor.
  IF not complemented GO to Normal.
  IF not Bound GO to Unbound.
  LOCATE Active Element from Bind of New Anchor.
  COPY Active Element to Moving Element.
  COPY POINTER Anchor to POINTER Previous.
  COPY Head of New Anchor to POINTER Following.

CONDITION Listart is POINTER Previous is equal to POINTER Anchor.
  CONDITION Listend is POINTER Following is NULL.
Search.
  IF Listend GO to Found.
  LOCATE Following Element from POINTER Following.
  COPY Following Element to Point-from Element.
  CALL Check.
  IF Priority of Moving Element is *related* Priority of Point-from Element GO to Found.

COPY Point-from Element to Point-to Element.
  COPY POINTER Following to POINTER Previous.
  COPY Next of Point-to Element to POINTER Following.
  LOCATE Previous Element from POINTER Previous.
  GO to Search.
Check.
  CHECK (Old Anchor, Current Anchor).
  IF FAILED RESTART from Retry.
  CHECK (Moving Element, Active Element).
  IF FAILED RESTART from Retry.
  IF Listart RETURN.
  CHECK (Point-to Element, Previous Element).
  IF FAILED RESTART from Retry.
  OTHERWISE RETURN.
Found.
  CONDITION Initial is Next of Moving Element is equal to Bind of New Anchor.
  CONDITION Pseudobound is Next of Moving Element is not equal to POINTER Following or Bind of New Anchor is equal to POINTER Previous.
  IF Initial GO to Juston.
  IF not Pseudobound GO to Insert.
  OTHERWISE GO to Unbind.
Juston.
  COPY Moving Element to New Element.
  COPY POINTER Following to Next of New Element.
  INCREMENT Emod of New Element.
  SWAP (Moving Element, New Element, Active Element).
  IF FAILED GO to Retry.
Insert.
  IF Listart GO to Sethead.
  COPY Point-to Element to New Element.
  COPY Bind of New Anchor to Next of New Element.
  INCREMENT Emod of New Element.

SWAP (Point-to Element, New Element, Previous Element).
IF FAILED GO to Retry.
Unbind.
  COPY Head of New Anchor to Bind of New Anchor. GO to Unbound.
Sethead.
  COPY Bind of New Anchor to Head of New Anchor.
  GO to Unbound.
Normal.
  CONDITION Empty is Head of New Anchor is NULL.
  CONDITION Taking is Next of Own Element is equal to POINTER Element.
  IF Empty GO to Void.
  IF not Taking GO to Put.

LOCATE Desired Element from Head of Old Anchor.
  GO to Take.
Void.
  IF Taking GO to Putcomp.
Put.
  COPY Head of Old Anchor to Next of Own Element.
  COPY POINTER Element to Head of New Anchor.
  GO to Swap.
Unbound.
  IF Taking GO to Putcomp.
  COPY Head of New Anchor to Next of Own Element.
  LOCATE Desired Element from Next of Own Element.
  COPY Next of Desired Element to Bind of New Anchor.
Take.
  COPY Next of Desired Element to Head of New Anchor.
  IF not Empty INCREMENT Amod of New Anchor.
  GO to Swap.
Putcomp.
  COPY POINTER Element to Bind of New Anchor.
Swap.
  SWAP (Old Anchor, New Anchor, Current Anchor).
  IF FAILED GO to Retry.
Exit.
  OUTPUT IS Head of New Anchor, Bind of New Anchor, Bind of Old Anchor, POINTER Element, Next of own Element, Head of Old Anchor.
  CONDITION Fail is Bound.
  CONDITION Schedule is bind of Old Anchor is not NULL and not Bound.
  CONDITION Taken is Head of New Anchor is not equal to POINTER Element. and not Bound and not Schedule.

WHEN Taken
    LOCATE Desired Element from Head of Old Anchor.
  WHEN Schedule
    LOCATE Desired Element from Next of Own Element.
    RETURN.

ANNEX 5—GENERAL ALGORITHM
General.
  (Preface)
  SET SWITCH Ownswitch to OFF.
  CONDITION Initiated is SWITCH Ownswitch is ON.
Retry.
  COPY Current Anchor to Old Anchor, New Anchor.
Own.
  (Test New Anchor)
  IF Initiated and not Active
    GO to Exit.
  IF Not Bound
    GO to Unbound.
Clear.
  (Identify and Verify next Transaction)
  IF Pseudobound
    GO to Own.
  (Perform next Transaction)
  IF FAILED GO to Retry
  OTHERWISE GO to Clear.
Unbound.
  IF Bindable
    GO to Init.
  (Perform Own Operation)
  IF FAILED GO to Retry.
  OTHERWISE GO to Exita.
Init.
  (Initiate Own Operation)
  IF FAILED GO to Retry.
  IF Nonproductive GO to Exitb.
  SET SWITCH Ownswitch to ON.
  GO to Clear.
Exit.
  Exita. Exitb. (Exits)

While the invention has been particularly shown and described with references to a preferred embodiment thereof, it will be understood by those skilled in the art that the foregoing and other changes in form and details may be made therein without departing from the spirit and scope of the invention.

Having thus described my invention, what I claim as new and desire to secure by Letters Patent is:

1. In a data processing system including a central processing unit and a main storage capable of executing a plurality of processes concurrently and wherein access to resources is shared by at least two of the processes, and where a first process executing in the central processing unit may be interrupted by a second process, the method of sharing control of the shared resources, comprising the steps of:
  storing in main storage, by a first process, control information to be associated with a shared resource indicating that an operation comprised of a sequence of steps is being performed by the first process utilizing the shared resource;
  immediately interrupting the execution of the first process in the central processing unit by a second process and initiating execution of the second process in the central processing unit;
  determining, by the second process, from the control information associated with the shared resource, whether steps of the operation being performed by the first process on the shared resource remain to be completed;

completing, by the second process, the steps of the operation on the shared resource initiated by the first process before commencing a new operation by the second process with the shared resource.

2. The method of claim 1 wherein the control information stored by said storing step includes:

an indication that data associated with the shared resource will be modified by the operation being performed by the first process.

3. The method of claim 2 wherein the control information stored by said storing step includes:

an indication of the sequence of steps of data modifications remaining before the operation being performed by the first process is completed.

* * * * *